(12) United States Patent
Rehm-Gumbel et al.

(10) Patent No.: US 12,601,643 B2
(45) Date of Patent: Apr. 14, 2026

(54) METHOD FOR OPERATING A TEMPERATURE CALIBRATOR WITH COOLING UNIT

(71) Applicant: SIKA Dr. Siebert & Kühn GmbH & Co. KG, Kaufungen (DE)

(72) Inventors: Michael Rehm-Gumbel, Niedenstein (DE); Thomas Meth, Kaufungen (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 345 days.

(21) Appl. No.: 18/322,769

(22) Filed: May 24, 2023

(65) Prior Publication Data

US 2023/0384173 A1 Nov. 30, 2023

(30) Foreign Application Priority Data

May 25, 2022 (DE) ..................... 10 2022 113 268.4

(51) Int. Cl.
*G01K 15/00* (2006.01)

(52) U.S. Cl.
CPC .................................. *G01K 15/002* (2013.01)

(58) Field of Classification Search
CPC ......... G01K 15/002; G01K 1/14; G01K 3/005
See application file for complete search history.

(56) References Cited

U.S. PATENT DOCUMENTS

| | | | | |
|---|---|---|---|---|
| 3,007,029 A | * | 10/1961 | Levine | H05B 1/0208 |
| | | | | 236/102 |
| 5,669,713 A | * | 9/1997 | Schwartz | G01K 15/00 |
| | | | | 374/1 |
| 8,801,271 B2 | * | 8/2014 | Harslund | G01K 15/00 |
| | | | | 374/208 |
| 2012/0000510 A1 | * | 1/2012 | Wiedeman | H10F 71/00 |
| | | | | 136/251 |
| 2014/0192834 A1 | | 7/2014 | Bronlund | |
| 2019/0041274 A1 | * | 2/2019 | Farley | G05D 23/1326 |
| 2021/0293632 A1 | * | 9/2021 | Parrish | G01J 5/802 |

FOREIGN PATENT DOCUMENTS

| | | | | |
|---|---|---|---|---|
| DE | 20317566 U1 | * | 2/2004 | ............. G01K 15/00 |
| DE | 10 2016 117572 B3 | | 9/2017 | |
| DE | 102019134019 A1 | * | 6/2021 | ........... G01K 15/007 |

(Continued)

OTHER PUBLICATIONS

Office Action dated Nov. 21, 2022 issued in German Application No. 10 2022 113 268.4.

*Primary Examiner* — Laura Martin
*Assistant Examiner* — Julia Fitzpatrick
(74) *Attorney, Agent, or Firm* — DINSMORE & SHOHL LLP

(57) ABSTRACT

A method of operating a temperature calibrator for calibrating a temperature sensor having a calibration block into which the temperature sensor is introduced and having a heating means by which the calibration block is heated and having a cooling unit by which the calibration block is cooled and an actuator by which the cooling unit is brought into thermal conductivity contact with the calibration block during cooling and is spatially separated from the calibration block during heating while forming an air gap. The invention further relates to a temperature calibrator is also disclosed.

15 Claims, 2 Drawing Sheets

(56)        References Cited

FOREIGN PATENT DOCUMENTS

| | | | | | |
|---|---|---|---|---|---|
| EP | 2 074 374 | B1 | | 7/2009 | |
| EP | 2793008 | A1 | * | 10/2014 | ........... G01K 15/005 |
| EP | 3 441 709 | A1 | | 2/2019 | |
| EP | 3296710 | B1 | * | 10/2019 | ............ G01K 15/00 |
| EP | 3428594 | B1 | * | 8/2021 | ........... G01K 15/005 |
| WO | WO-2013113683 | A2 | * | 8/2013 | ........... G01K 15/005 |

* cited by examiner

METHOD FOR OPERATING A TEMPERATURE CALIBRATOR WITH COOLING UNIT

FIELD OF THE INVENTION

The invention relates to a method of operating a temperature calibrator for calibrating a temperature sensor having a calibration block into which the temperature sensor is introduced and having a heating means by which the calibration block is heated and having a cooling unit by which the calibration block is cooled. The invention further relates to a temperature calibrator for calibrating a temperature sensor that can be operated using the method in accordance with the invention.

BACKGROUND OF THE INVENTION

Temperature calibrators are known from EP 2 074 374 B1 or from EP 3 441 709 A1 by which temperature sensors can be calibrated and the temperature calibrators have a calibration block into which the temperature sensor can be introduced and the temperature calibrator has a heating means and furthermore a cooling unit in order to calibrate both at high temperatures well above 0° C. and at low temperatures below 0° C.

The cooling unit has a Sterling engine that is operated with helium gas as a rule. If calibration temperatures that are, for example, above 50° C. are approached, it must be ensured that the helium gas is not heated above this temperature since the Sterling engine may be damaged thereby. To avoid any damage to the Sterling engine and thus to the total cooling unit, so-called thermosiphons are used and the thermal coupling between the cooling unit and the calibration block is made possible by a coolant by which the thermosiphon is operated. The thermosiphon thus extends between the calibration block and the cooling unit and the coolant is condensed at the side of the thermosiphon located at the cooling unit and the coolant is evaporated again at the side of the thermosiphon located at the calibration block. The calibration block can thus be brought to the required deep temperatures, for example to −60° C. If the calibration block is heated by the heating means and if the cooling unit is switched off to this extent, the coolant can escape into an external chamber so that the thermosiphon can also remain correspondingly undamaged.

The thermosiphon consequently forms a link that reliably prevents an overheating of the Sterling engine of the cooling unit when the coolant is transferred into the external chamber for the thermal separation between the heated calibration block and the cooling unit. However, the use of a thermosiphon is disadvantageously required, which makes the design of the temperature calibrator and the carrying out of the method complex and/or expensive, in particular on the change between high temperatures and low temperatures.

SUMMARY OF THE INVENTION

The object of the invention comprises the simplification of a method of operating a temperature calibrator the simplification of the design of a temperature calibrator in accordance with the embodiments disclosed herein. It is in particular the object of the invention to avoid the use of a thermosiphon in temperature calibrators that can be heated and cooled and to this extent it is the object of the invention also to avoid the use of the external vessel for the coolant of the thermosiphon.

This object is achieved starting from a method and a temperature calibrator in accordance with the embodiments disclosed herein in conjunction with the respective characterizing features. Advantageous further developments of the invention are set forth in the dependent claims.

The invention includes the following steps in accordance with the invention for carrying out the method: configuring an actuator by which the cooling unit is brought into thermal contact with the calibration block during cooling and is spatially separated from the calibration block during heating while forming an air gap.

In the carrying out of the method in accordance with the invention for operating the temperature calibrator, the cooling unit can be protected from overheating by the formation of the air gap in that the actuator is controlled in a simple manner and the air gap can be increased in size at correspondingly higher temperatures of the calibration block such that the cooling unit is not heated above a critical temperature. A thermosiphon can thus, for example, also be dispensed with for the operation of the temperature calibrator at low temperatures considerably below 0° C., whereby the operation of the temperature calibrator, in particular the technical design of the temperature calibrator, is simplified and comprises fewer components.

The cooling unit advantageously has a refrigeration unit having a cooling head, wherein the refrigeration unit in particular comprises a Sterling engine and wherein the cooling head can be cooled by the refrigeration unit. In this respect, only the cooling head or the cooling head together with the refrigeration unit can be moved relative to the calibration block by the actuator to establish the air gap or to change its size or to establish the thermal conductivity contact between the calibration block and the cooling unit.

The method is in particular carried out by means of a controller by which the air gap between the cooling unit and the calibration block is regulated in that the actuator is regulated by the controller. The actuator can here also deliver information on the size of the air gap to the controller so that the controller receives information on which dimension the air gap currently has or whether the thermal conductivity contact has been established between the calibration block and the cooling unit.

A temperature sensing element is further advantageously configured that is in particular arranged in, at, or in the region of the cooling head, with a temperature value being recorded by the temperature sensing element and in particular being output to the controller. The air gap can here be controlled exclusively via the temperature information of the temperature sensing element or the controller additionally takes account of information on the size of the air gap that is output as described above by the actuator, for example.

The method in accordance with the invention can thus be further improved if a critical temperature of the cooling head is defined, with the air gap being generated or increased in size on an exceeding of the critical temperature and in that the thermal conductivity contact is again established between the cooling unit and the calibration block on a falling below of the critical temperature. The critical temperature can correspond to the temperature at which the cooling unit and in the refrigeration unit in the form of a Sterling engine may be heated to a maximum. In particular Sterling engines that comprise helium as the coolant should not be heated over 50° C. so that this temperature forms the critical temperature, for example.

The actuator can be designed such that the air gap is either generated and thus has a fixed value or the air gap is eliminated and the thermal conductivity contact is produced between the cooling unit and the calibration block, in particular by means of an indirect or direct solid state contact. It is, however, also conceivable here that the controller tracks the air gap between the cooling unit and the calibration block by means of the actuator before, during, and/or after a heating of the calibration block such that the cooling unit and in particular the cooling head remains at the critical temperature or slightly below the critical temperature. The smaller the temperature difference between the calibration block and the cooling unit, the smaller the air gap can be selected and in particular tracked.

The invention further relates to a temperature calibrator for calibrating a temperature sensor comprising a calibration block in which the temperature sensor can be introduced and comprising a heating means by which the calibration block is heatable and comprising a cooling unit by which the calibration block is coolable, with an actuator being configured by which an air gap between the calibration block and the cooling unit can be generated and/or set.

The actuator can be designed together with and/or as an assembly with the cooling unit or the actuator has a connection to the cooling unit to transpose it spatially. The actuator and the cooling unit can also be designed in component unity or the actuator forms a movable link between the cooling unit and the calibration block. It is also possible to this extent that the actuator is arranged at or in the temperature calibrator and the cooling unit can be moved relative to the calibration block by the actuator. It is also possible to this extent that the calibration block is transposed or moved relative to the cooling unit.

The air gap can be set here such that the cooling unit can be brought into thermal contact with the calibration block during the cooling and such that the air gap can be generated or increased in size by means of a spatial separation of the cooling unit from the calibration block during the heating. The temperature calibrator and/or the cooling unit has/have a controller by which the actuator can in particular be controlled for the setting or regulation of the air gap.

The cooling unit advantageously has a cooling head that can be brought into thermal conductivity contact with the calibration block, with a locking ring and/or an insulating ring being arranged on the cooling head and/or with the thermal conductivity contact being formed via the locking ring. The cooling head can thus either be brought directly into solid state contact with the cooling unit or the formation of the thermal conductivity contact takes place at least indirectly via a further element, for example a locking ring. The insulating ring can surrounded the locking ring radially peripherally at the outer side and the insulating ring advantageously has a peripheral pot or collar that dips into an annular gap in the calibration block or surrounds the calibration block so that the cooling head of the cooling unit remains substantially insulated, and indeed independently of the presence of the air gap.

A temperature sensing element is further advantageously arranged in or at the cooling head, the temperature sensing element can in particular be received in the locking ring. The temperature sensing element can here deliver a temperature value to the controller via which the air gap between the cooling unit or the cooling head and the calibration block can consequently be adjusted. In addition, the actuator can comprise a distance measurement unit by means of which a value of the air gap can be transmitted to the controller.

The calibration block can further advantageously comprise or form a calibration sleeve so that the contact of the cooling unit and in particular of the cooling head preferably takes place directly by the calibration sleeve. The heating means here, for example, surrounds the calibration sleeve or a calibration volume that forms the reception region for the reception of the calibration sleeve in the calibration block so that the heat can be input directly into the sleeve on a heating of the calibration block and in particular of the calibration sleeve of the calibration block.

The actuator can form a lifting device in different manners. The actuator can, for example, comprise a lifting solenoid, a spindle and nut unit, a stepper motor, a piezo motor, a motor and transmission unit, or a pneumatic or hydraulic unit.

BRIEF DESCRIPTION OF THE DRAWINGS

Further measures improving the invention will be shown in more detail below together with the description of a preferred embodiment of the invention with reference to the Figures. There are shown.

DETAILED DESCRIPTION OF THE INVENTION

Figure 2:
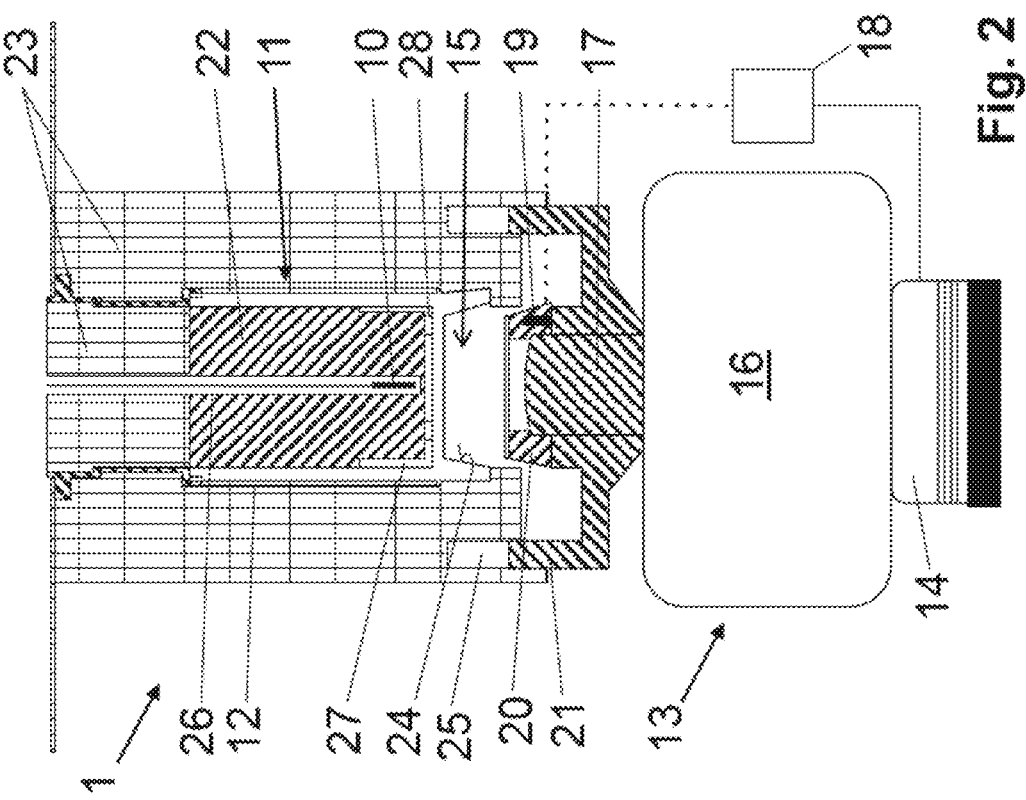
FIG. 2 a temperature calibrator in accordance with FIG. 1, with there being an air gap between the cooling unit and the calibrator.
Figure 1:
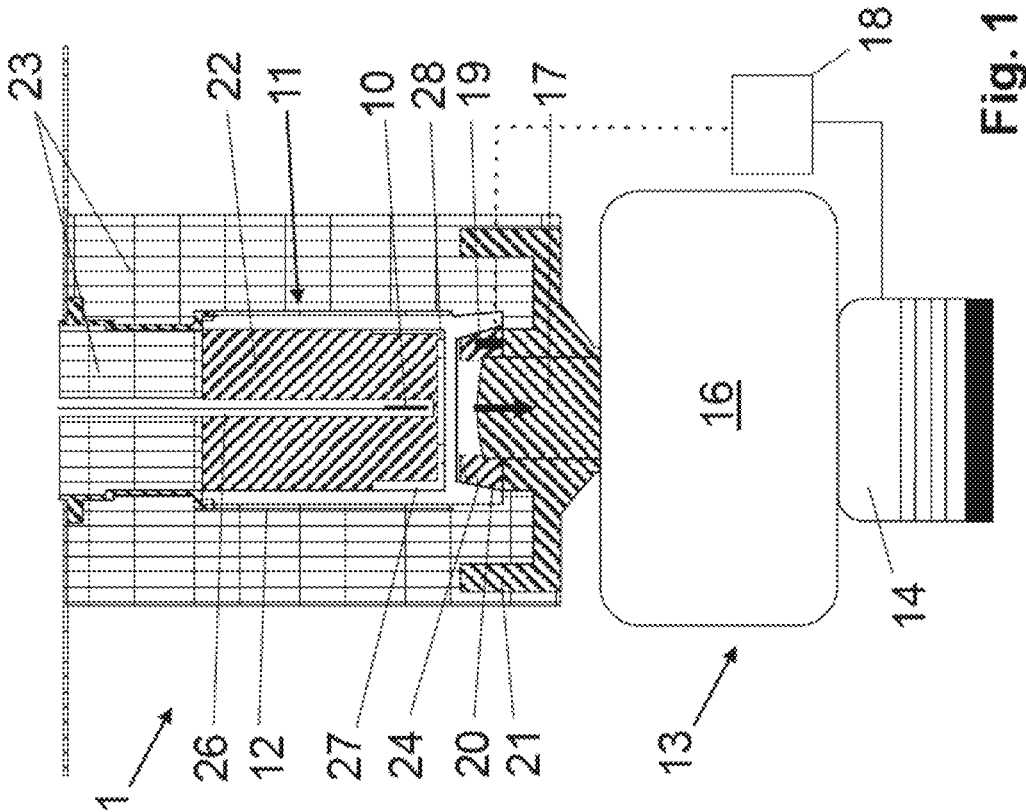
FIG. 1 a temperature calibrator having a calibration block, a cooling unit, and an actuator, with a thermal conductivity contact being present between the calibration block and the cooling unit.

A temperature calibrator 1 is shown in a schematic manner in FIGS. 1 and 2 and the temperature calibrator 1 has a calibration block 11 comprising a hollow cylindrical calibration volume and a calibration sleeve 22 inserted therein. A heating means 12, for example in the form of a heating film, with other forms of heating means, in particular resistance heaters, in particular also being able to be used, is located at the outer side at the calibration block 11. The calibration block 11 is here surrounded, except at a bottom side, by an insulation 23 comprising a plurality of insulating elements.

At the base side, the calibration block 11 has a cooling contact surface 24 and the cooling unit 13 can be brought into thermal conductivity contact with the cooling contact surface 24. The cooling unit 13 has a cooling head 17 for this purpose that can be brought into contact with the cooling contact surface 24 by means of a locking ring 20 attached to the cooling head 17, as shown in FIG. 1. FIG. 2, in contrast, shows an air gap 15 between the cooling head 17 or the locking ring 20 and the cooling contact surface 24.

An actuator 14 serves to establish either the thermal conductivity contact in accordance with FIG. 1 or the air gap 15 in accordance with FIG. 2 between the cooling head 17 or the locking ring 20 of the cooling unit 13 and the cooling contact surface 24 of the calibration block 11, by which actuator 14 by way of example the cooling unit 13 and to this extent also the cooling head 17 with the locking ring 20 can be traveled up and down to form the gap or to establish the thermal conductivity contact with the cooling contact surface 24 with an otherwise stationary calibration block 11. The actuator 14 is only shown schematically and it can be designed in a different manner, in particular as a lifting device that can be controlled by a controller 18 of the temperature calibrator 1, with the actuator 14 and the controller 18 in particular being components of the temperature calibrator 1.

The cooling unit 13 has a temperature sensing element 19 that is shown by way of example arranged in the locking ring 20 and the temperature sensing element 19 can also be attached in another manner in or in the region of the cooling head 17. The temperature sensing element 19 provides a temperature value that can be received by the controller 18. Depending on the temperature of the cooling head 17 that can be determined in this manner, the actuator 14 can be controlled by means of the controller 18 such that the cooling head 17 and thus the cooling unit 13 do not exceed a critical temperature. The greater the temperature of the calibration block 11 is, the greater the temperature in or at the cooling head 17 also becomes that is sensed by the temperature sensing element 19 and the greater the air gap 15 is set by the controller 18 as a consequence thereof in that the actuator 14 is correspondingly controlled. The heating of the calibration block 11 takes place by means of the heating means 12 here that can heat the calibration block 11 and thus also the cooling contact surface 24 above a critical temperature. To avoid a heating of the cooing head 17 above the critical temperature, for example 50° C., the air gap 15 can be correspondingly increased in size by means of the actuator 14 to weaken the heat transfer from the heated calibration block 11 into the cooling head 17 and thus into the cooling unit 13.

An approximately pot-shaped insulating ring 21 is shown around the cooling head 17 and can dip into an annular groove 25 that is introduced into an insulation 23 of the calibration block 11. The effect of ice formation at the cooling head 17 is thus minimized if it adopts temperatures below freezing point.

The calibration block 11 is substantially formed by a calibration volume into which the calibration sleeve 22 is inserted, with the calibration sleeve being able to be removed from the calibration volume in a manner known per se to swap it, for example, with different embodiments. A bore 26 into which the temperature sensor 10 is introduced is inserted centrally in the calibration sleeve 22. The calibration sleeve 22 has a smaller diameter in the lower region facing in the direction toward the cooling contact surface 24, whereby an annular gap 27 is formed that moreover merges into a base gap between the calibration sleeve 22 and the inner side of the cooling block 11. The base gap is generated, for example, by a ring or by a, for example, peripheral projection 28, that secures the base gap at the lower side. A uniform temperature profile can thus be generated in particular on a cooling in the calibration block 11 and in particular in the calibration sleeve 22. The region in which the temperature sensor 10 is arranged in particular does not cool down excessively on the cooling of the calibration block 11 over the cooling contact surface 24, whereas the upper, remaining region of the calibration sleeve 22 still has a higher temperature.

Figure 3:
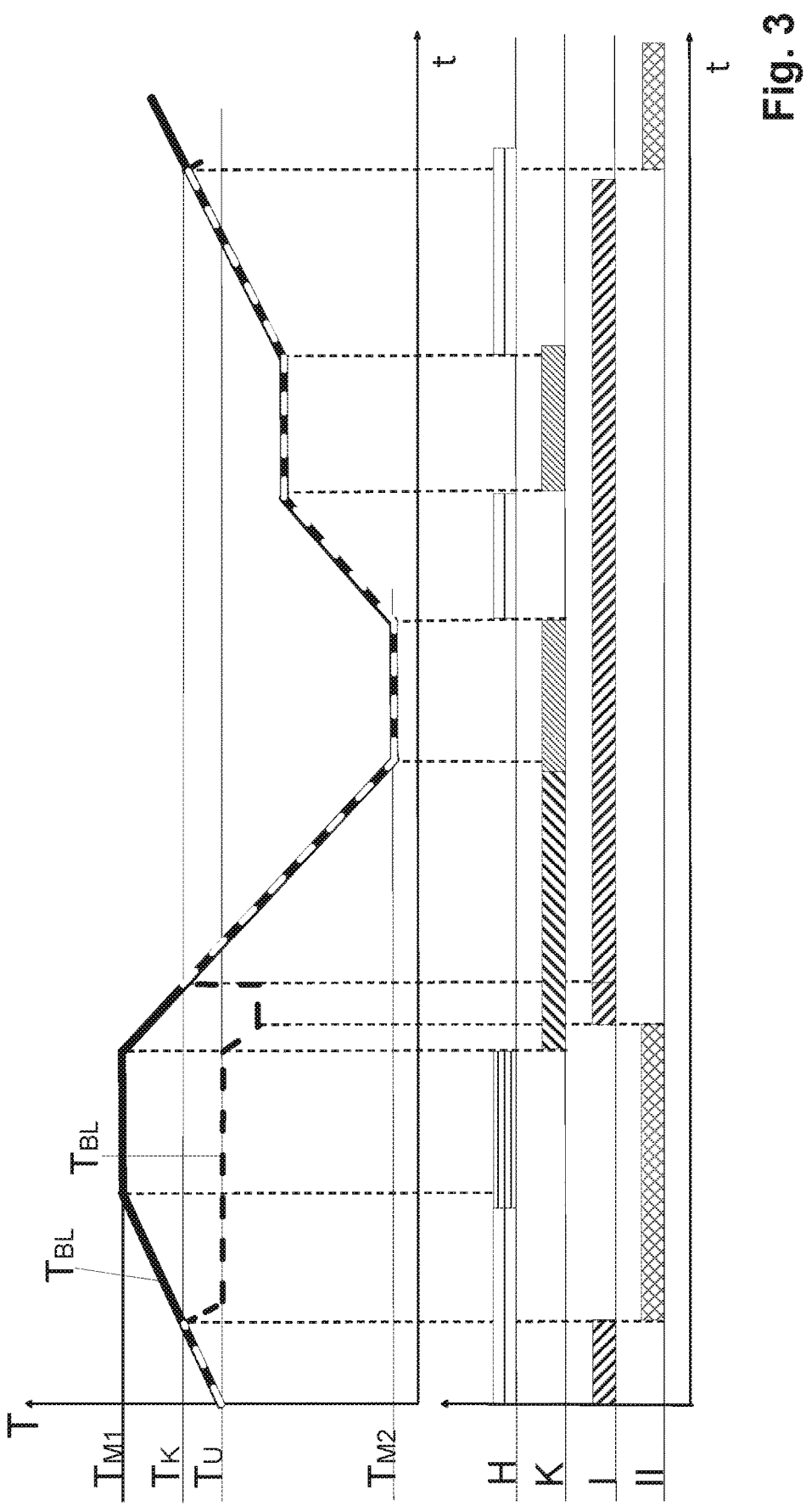
FIG. 3 the view of a temperature progression of the calibration block and of the temperature progression of the cooling unit, with both a heating operation, a cooling operation, and the set gap between the cooling unit and the calibration block over time furthermore being entered.

FIG. 3 shows the progression of temperatures of the cooling head and of the calibration block over time in a schematic manner, with the temperature on the ordinate being called T while the time on the abscissa is called t.

The diagram of the temperature over time shows two temperature progressions that are formed by the temperature $T_{BL}$ of the calibration block and the temperature $T_{KK}$ of the cooling head. If the temperature $T_{BL}$ of the cooling block is heated in accordance with the exemplary progression to a first measurement temperature $T_{M1}$, starting from an environmental temperature $T_U$, the measurement temperature $T_{M1}$ exceeds the critical temperature $T_K$. Until the critical temperature $T_K$ is reached, the cooling head is still in a contact position with the cooling contact surface of the calibration block that is shown in the diagram by bars at a position I in solid state contact between the calibration block and the cooling head. On the reaching of the critical temperature $T_K$, the actuator travels the cooling head such that the air gap is produced, shown by bars at the position II and to this extent with an air gap between the calibration block and the cooling head. After a holding period of the measurement temperature $T_{M1}$ and a further cooling of the calibration bock, the critical temperature $T_K$ is again fallen below and the position I with a solid state contact between the cooling head and the calibration block is again reached up to a further measurement temperature $T_{M2}$ that can be below 0° C. as the cooling temperature.

The further progression again shows an increase in the temperature of the calibration block $T_{BL}$ that again reaches and exceeds the critical temperature $T_K$, beyond the environmental temperature $T_U$, at which finally the position II is again adopted with the air gap between the calibration block and the cooling head.

A heating operation H, marked by the bar progression at H takes place corresponding to the temperature progression and corresponding to the set air gap or to the set solid state contact and a bar progression at K takes place in cooling operation K in a secondary diagram.

It becomes clear by the shown setting of the two positions of solid state contact I and air gap II that the cooling head cannot exceed the critical temperature $T_K$ since whenever the calibration block exceeds the critical temperature, the solid state contact is released and the air gap is set.

Damage to the cooling unit, comprising a Sterling engine, is thus effectively avoided even though a thermosiphon between the cooling unit and the calibration block is no longer required.

The invention is not restricted in its design to the preferred embodiment specified above. A number of variants is rather conceivable that also makes use of the solution shown with generally differently designed embodiments. All the features and/or advantages, including any construction details or spatial arrangements, originating from the claims, the description, or the drawings can be essential to the invention both per se and in the most varied combinations.

REFERENCE NUMERAL LIST

1 temperature calibrator
10 temperature sensor
11 calibration block
12 heating means
13 cooling unit
14 actuator
15 air gap
16 refrigeration unit
17 cooling head
18 controller
19 temperature sensing element
20 locking ring
21 insulating ring
22 calibration sleeve
23 insulation
24 cooling contact surface
25 annular groove
26 bore
27 annular gap
28 projection:

T temperature
$T_K$ critical temperature
$T_{BL}$ temperature of the calibration block
$T_{KK}$ temperature of the cooling head
$T_U$ environmental temperature
$T_{M1}$ measurement temperature
$T_{M2}$ measurement temperature
t time
I position of the solid state contact
II position for the air gap
H heating operation
K cooling operation
The invention claimed is:

1. A method of operating a temperature calibrator for calibrating a temperature sensor including:
  a calibration block into which the temperature sensor is introduced;
  a cooling contact surface located at the calibration block;
  a heating means by which the calibration block is heated;
  a cooling unit by which the calibration block is cooled; and
  an actuator,
  the method comprising bringing the cooling unit into thermal conductivity contact with the cooling contact surface of the calibration block during cooling and bringing the cooling unit to be spatially separated from the cooling contact surface of the calibration block on heating while forming an air gap by the actuator.

2. The method according to claim 1, wherein the cooling unit has a refrigeration unit having a cooling head that Is coolable by the refrigeration unit, the method further comprising moving at least the cooling head or the cooling head together with the refrigeration unit being relative to the calibration block by the actuator.

3. The method according to claim 1, further comprising regulating the air gap between the cooling unit and the calibration block by regulating the actuator with a controller.

4. The method according to claim 1, wherein a temperature sensing element is configured to be disposed in, at, or in the region of the cooling head, the method further comprising recording a temperature value by the temperature sensing element and outputting the temperature value to the controller.

5. The method according to claim 1, further defining a critical temperature of the cooling head, with the air gap being generated or increased in size on an exceeding of the critical temperature and with the thermal conductivity contact being again established between the cooling unit and the calibration block on a falling below of the critical temperature.

6. The method according to claim 5, further comprising tracking by the controller the air gap between the cooling unit and the calibration block by the actuator before, during, or after a heating of the calibration block such that the cooling unit including the cooling head remains at the critical temperature or slightly below the critical temperature.

7. A temperature calibrator for calibrating a temperature sensor, comprising:
  a calibration block into which the temperature sensor is introduced;
  a cooling contact surface located at the calibration block;
  a heating means by which the calibration block is heatable;
  a cooling unit by which the calibration block is coolable; and
  an actuator is configured to generate or set an air gap between the cooling contact surface of the calibration block and the cooling unit.

8. The temperature calibrator according to claim 7, wherein the air gap can be set such that the cooling unit can be brought into thermal conductivity contact with the calibration block during the cooling and the air gap can be generated or increased in size by a spatial separation of the cooling unit from the calibration block during the heating.

9. The temperature calibrator according to claim 7, wherein the cooling unit has a cooling head that can be brought into thermal conductivity contact with the calibration block, with a locking ring or an insulating ring being arranged on the cooling head and/or with the thermal conductivity contact being formed via the locking ring.

10. The temperature calibrator according to claim 9, wherein a temperature sensing element is disposed in or at the cooling head or the temperature sensing element is disposed in the locking ring.

11. The temperature calibrator according to claim 7, wherein the actuator has a lifting device, a lifting solenoid, a spindle and nut unit, a stepper motor, a piezo motor, a motor transmission unit, a pneumatic, or hydraulic unit.

12. The method according to claim 1, wherein the heating means is a heating film.

13. The method according to claim 1, wherein the heating means is a resistance heater.

14. The temperature calibrator according to claim 7, wherein the heating means is a heating film.

15. The temperature calibrator according to claim 7, wherein the heating means is a resistance heater.

* * * * *